(12) United States Patent
Thompson et al.

(10) Patent No.: US 11,671,411 B2
(45) Date of Patent: *Jun. 6, 2023

(54) SECURE STORAGE AND DATA EXCHANGE/SHARING SYSTEM USING ONE TIME PADS

(71) Applicant: Introspective Power, Inc., Broomfield, CO (US)

(72) Inventors: Anthony Scott Thompson, Broomfield, CO (US); Steven Paul Cummings, Canonsburg, PA (US); Margaret A. Philpot, Nashville, IL (US); Brian E. Meilke, Aurora, CO (US)

(73) Assignee: Introspective Power, Inc., Broomfield, CO (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/523,283

(22) Filed: Nov. 10, 2021

(65) Prior Publication Data

US 2022/0141203 A1 May 5, 2022

Related U.S. Application Data

(63) Continuation of application No. 15/866,302, filed on Jan. 9, 2018, now Pat. No. 11,196,720.

(60) Provisional application No. 62/444,166, filed on Jan. 9, 2017.

(51) Int. Cl.
| | |
|---|---|
| *H04L 29/06* | (2006.01) |
| *H04L 9/40* | (2022.01) |
| *H04L 9/06* | (2006.01) |
| *H04L 9/12* | (2006.01) |
| *H04L 9/32* | (2006.01) |
| *H04L 9/08* | (2006.01) |

(52) U.S. Cl.
CPC ........ *H04L 63/0435* (2013.01); *H04L 9/0656* (2013.01); *H04L 9/0668* (2013.01); *H04L 9/0894* (2013.01); *H04L 9/12* (2013.01); *H04L 9/321* (2013.01)

(58) Field of Classification Search
None
See application file for complete search history.

(56) References Cited

U.S. PATENT DOCUMENTS

| | | | | |
|---|---|---|---|---|
| 2003/0026431 A1* | 2/2003 | Hammersmith | ........ | H04L 9/083 380/277 |
| 2008/0140661 A1* | 6/2008 | Pandya | ................ | G11C 15/043 |
| 2015/0186657 A1* | 7/2015 | Nakhjiri | ................ | H04L 9/0825 713/193 |
| 2017/0033925 A1* | 2/2017 | DeNeut | ................ | H04L 9/0819 |
| 2018/0048464 A1* | 2/2018 | Lim | ...................... | H04L 9/0894 |
| 2018/0183581 A1* | 6/2018 | Elbaz | ...................... | G09C 1/00 |

* cited by examiner

*Primary Examiner* — Andrew J Steinle
(74) *Attorney, Agent, or Firm* — Nixon & Vanderhye P.C.

(57) ABSTRACT

A streaming one time Pad cipher using a One Time Pad (OTP) provides secure data storage and retrieval. The data that is encrypted using the one time pad is stored in a repository that is separate from the generation and/or storage for the one time pad.

19 Claims, 8 Drawing Sheets

Figure 1

Fig. 1A: STOP Hardware Implementation

SECURE STORAGE AND DATA EXCHANGE/SHARING SYSTEM USING ONE TIME PADS

CROSS-REFERENCE TO RELATED APPLICATIONS

This application claims benefit of U.S. patent application Ser. No. 15/866,302, filed Jan. 9, 2018, which claims benefit of Provisional Patent Application No. 62/444,166, filed Jan. 9, 2017, the entire disclosure of which is incorporated herein by reference as if expressly set forth.

FIELD

The technology herein relates to computer security, and more particularly to secure methods for storing data on a network.

BACKGROUND

Secure storage of data has become of paramount importance. We read every day about yet another attack by hackers who have been able to access highly sensitive private, confidential or secret data. While our data networks make it easy to share information, safeguarding privacy has become a major concern.

One-time Pads ("OTP's") were invented early on in the 20th century and are the only provably secure cryptosystem. In a manual one time Pad scenario, the sender has a pad of paper on which is written randomly chosen key letters. The key is the same size as the message. In one implementation, the sender adds one key letter to each plaintext letter to produce cipher text, and never repeat the key letters. For example, assume the message is "YES" and the Pad letters are "CMG". You add Y (25) to C (3) to get B (26+3=2 modulo 26), or E (5) to M (13) to get R (18). The sender then destroys the paper. The receiver reverses the process using his pad of paper (the encryption is thus symmetric), and then burns the key letters when he is done. Because the key is the same size as the plaintext, every possible plaintext is equally likely and it is impossible for an attacker to tell when the correct decryption has been derived. See e.g., Schneier, *Secrets and Lies: Digital Security In a Networked World* (Wiley Publishing, 2000).

Applicant has previously made improvements to such technology. See e.g., commonly-assigned U.S. Pat. No. 8,995,652, US20150043730, and WO2015021477A1, which describe apparatus and methods for generating one-time-Pads and using one-time-Pads to protect and encrypt information. These prior patent applications and patents are expressly incorporated herein by reference as if expressly set forth.

Even in systems that are still secure now, history has shown exploits will be found over time. Further improvements are desirable.

BRIEF DESCRIPTION OF THE DRAWINGS

Example non-limiting embodiments and implementations will be better and more completely understood by referring to the following detailed description in conjunction with the drawings of which.

DETAILED DESCRIPTION OF NON-LIMITING EXAMPLE EMBODIMENTS

Example non-limiting embodiments provide mechanisms, methods, apparatus, systems, arrangements, and computer readable storage media for securely saving/storing data remotely.

In some non-limiting embodiments, an entropy cache is generated, maintained and/or sent with a separate process. This essentially separates the concern of entropy caching from data transmission. Data transmission and storage can be performed in any manner, on any channel(s) in a secure or non-secure way. In one example embodiment, data storage and transmission can be conducted in the "cloud"—namely, a computer arrangement remote from users that is accessable via a network such as the Internet. Hacking or otherwise compromising the data transmission part of the system yields no useful information to an attacker because the data transmission part does not have the security-related information (e.g., the entropy cache) needed to decrypt and read the transmitted messages.

The part of the system that generates and maintains the entropy cache can be separate and remote or otherwise isolated from the data transmission portion, communicate using different channels of communication and be protected to achieve any desired level of security.

Some embodiments thus provide different systems that don't communicate together and may not even be associated with one another.

In such arrangements, one system is used to provide data at least in part encrypted using a one time Pad to the network/cloud, and another (different) system is used to provide a one time Pad (entropy cache) needed or used to decrypt the data. A client, user or computer that wants to access the storage data obtains the data from one or more systems, the one time Pad from another one more different systems, and then uses these two (or more) sources in combination to decrypt and obtain clear text. Separate secrets can be used or provided in each side of the process.

In one example non-limiting embodiment, the one time Pad is streamed continually or discontinually on an on-demand basis for use in encrypting and decrypting. Thus, the one time Pad may be provided serially to a further part of the system that uses the serially-streamed one time Pad to encrypt or decrypt. In other example embodiments, the one time Pad may be provided in chunks. Additional chunks are provided when previously provided chunks have been used to encrypt or decrypt.

To further increase security, randomness can be used in encryption and transmission. Authentication can be used to authenticate a second client different from the client that stored the encrypted data. The encrypted data and the one time Pad needed to decrypt it can be stored in different repositories.

Example non-limiting embodiments include some or all of the following features:
  Sharing ciphertext and Pad data
  Authentication; preferably multi factor
  Sender and Receiver can be the same person (or not)
  Pad and ciphertext data may be left to retrieve again at a later date or removed and re-padding each time accessed.
  Multi-access with same Pad (multiple user authentication) as long as its only decrypting and corresponds to a single, unique piece of ciphertext data.
  Pad/encrypt per user as a sharing technique.

The Figures show example non-limiting embodiments used to permit data to be stored anywhere including remotely (e.g., in the cloud or otherwise remotely or isolated from a sending computing device). The arrangements shown in these Figures can be used by a client computing device to store data remotely from it, or it can be used to communicate information to another client computing device(s)—all without risk of the data being discovered or revealed. These non-limiting embodiments provide ways to save data in the cloud or other location securely. Some non-limiting embodiments make use of two different computing devices that don't communicate with one another but may share a secret.

Figure 1:
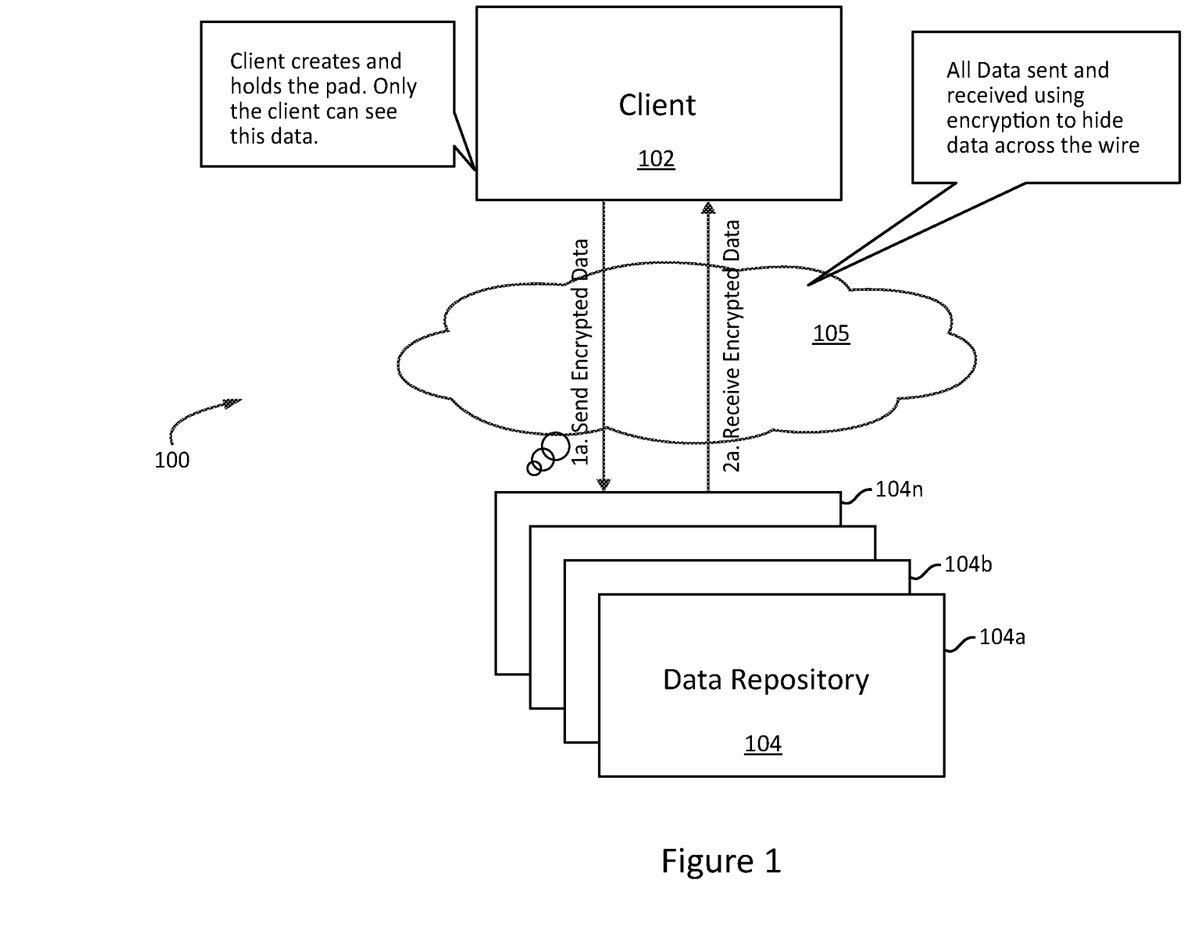
FIG. 1 is a block diagram showing an example non-limiting Streaming Transmission OTP Protocol Storage ("STOPS") where a client holds the Pad.

FIG. 1 shows an example storage system 100 including a client 102 and a data repository(ies) 104. In one example non-limiting embodiment, data repository 104 can comprise any number of different data repositories 104a, 104b, . . . 104n located in the same or different locations. In the example shown, client 102 may comprise any computing device such as a processor executing instructions stored in non-transitory memory, a programmed logic array, an application specific integrated circuity implemented in hardware, or any other suitable device. Data repository(ies) 104 similarly may comprise any computing device as indicated above, and may include some type of additional data storage for storing data received from client 102 and in some cases provide stored data to the client upon client request or based on other criteria (e.g., a predetermined schedule, occurrence of an event, etc.).

In the example shown, the client 102 creates and holds ("entropy store") a one time Pad (OTP). The client 102 uses the OTP to encrypt data that the client then supplies to repository 104. Since the client 102 is the only entity that has the OTP, it is the only entity able to decrypt the data. Access to the repository 104 will not give an attacker access to the data because the data is encrypted and can be decrypted only using the OTP that the client 102 possesses. The attacker would need to compromise the client 102 in order to gain access to the data in repository 104.

In one example non-limiting embodiment, the client 102 encrypts all data sent to and received from repository 104 to hide the data across one more networks 105. In this case, "network" can comprise any sort of communications capability including point-to-point or point-to-multipoint and can include any type of communications facilities including TCP/IP, wireless or wired, Ethernet, Bluetooth, Near Field Communications, GSM, or any other desired or convenient protocols and physical layers.

Figure 1A:
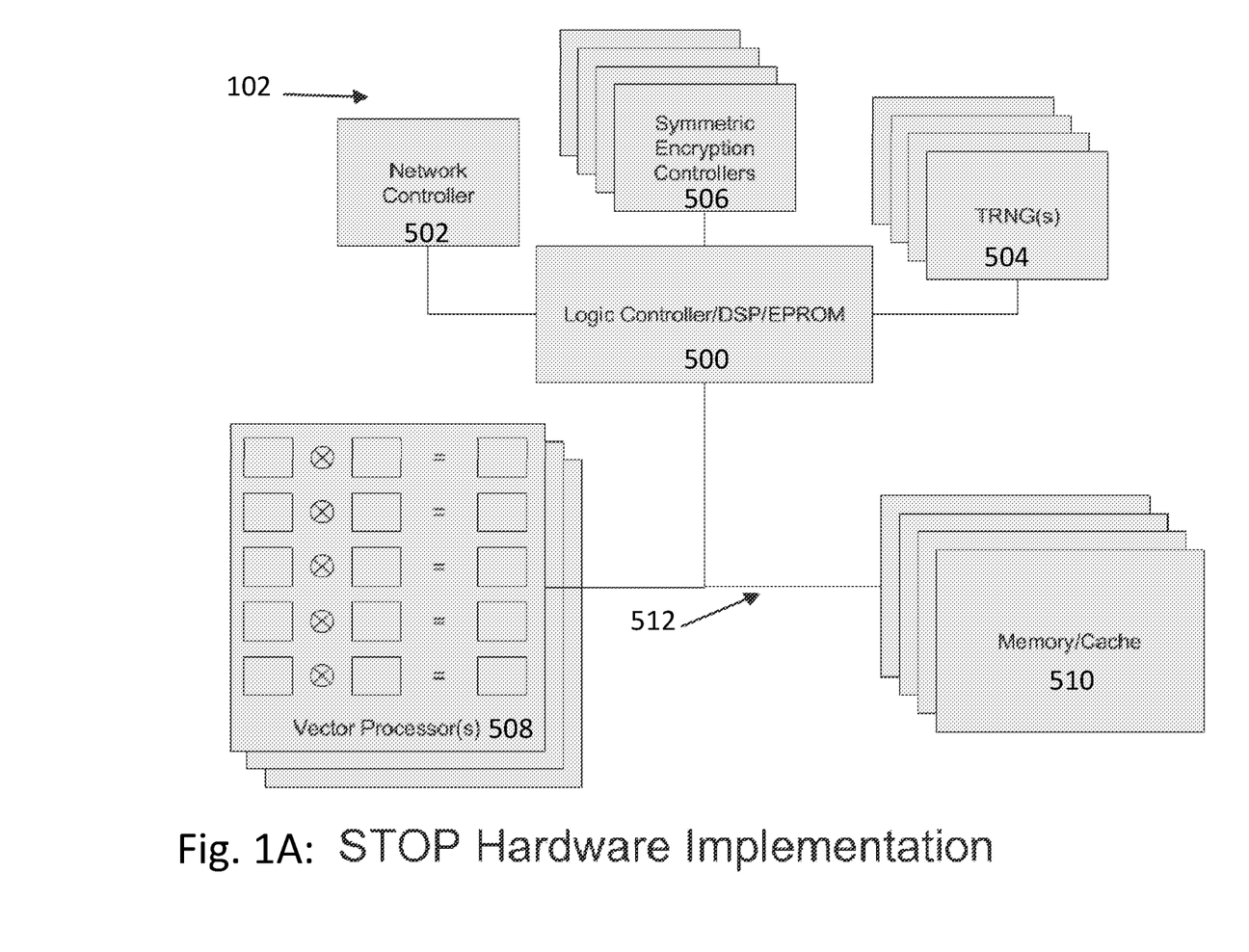
FIG. 1A shows an example non-limiting hardware implementation.

FIG. 1A shows an example hardware implementation of the FIG. 1 client 102. In the example implementation shown, client 102 includes one or more vector processor(s) 508 coupled to one or more memories/caches 510 by one or more busses 512. The vector processor(s) 508 executes software instructions stored in the memories/caches 510, and retrieves data from and stores data to the memories/caches. Also included in the FIG. 1A architecture is a logic controller/DSP/EPROM 500 which is connected to buss(es) 512 but prevents unrestricted access by applications executing on the vector processor(s) 508 and/or external network devices to certain other components such as a network controller 502, symmetric encryption controller(s) 504 and true random number generator(s) (TRNG) 504. Symmetric encryption controller(s) 504 can each comprise a hardware module that performs symmetric encryption and/or decryption. The TRNG's 504 supply entropy information based on for example power supply voltage fluctuations, photoelectric noise, or other physical effect(s). The network controller 502 allows client 102 to communicate with network 105 (see FIG. 1) in a way that does not permit external network devices to access internal parts of the client architecture. In particular, logic controller/DSP/EPROM 500 provides hardware-based security that allows authorized applications executing on vector processor(s) 508 to communicate with network 105 via network controller 502 but which does not allow network devices on the network or unauthorized applications executing on the vector processors to communicate with portions of memory/cache 510 storing OTP or other entropy data generated by TRNGs 504. However, logic controller/DSP/EPROM 500 permits vector processor(s) 508 and/or encryption controllers 506 to access such stored or generated OTP information so that client 102 can encrypt and decrypt.

Figure 6:
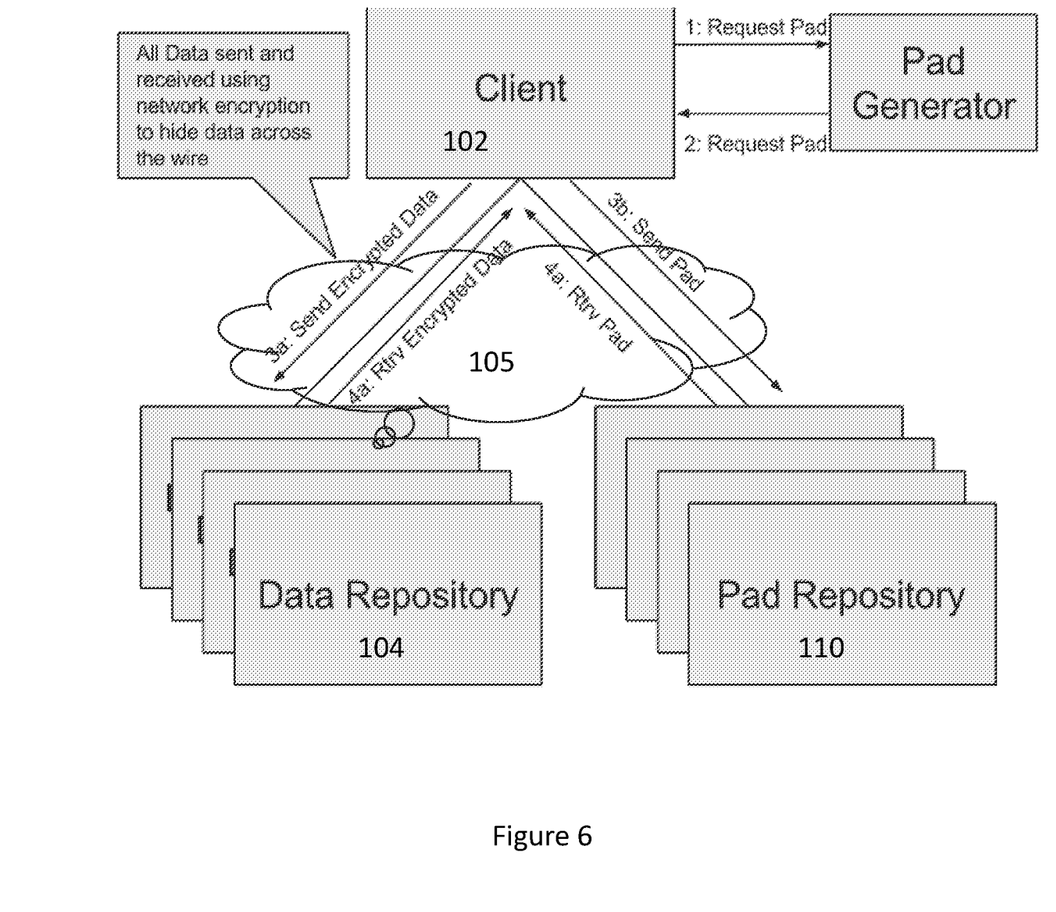
FIG. 6 shows an example non-limiting variation of FIG. 5 using a separate Pad generator.

FIG. 6 shows an example non-limiting embodiment in which a client 102 uses a data repository 104 to store the encrypted data and a separate Pad repository 110 to store the one time Pad(s) used to encrypt the data. Under such an arrangement, an attacker who accesses any of the entities shown in FIG. 6 will not be able to decrypt data to obtain clear text. Rather, the client 102 could use repositories 104 spread across the Internet or other network 105 that are completely different from and in no way associated with repositories 110 (also spread across the Internet or other network 105) the client uses to store corresponding OTPs. If the locations (URLs) of these various repositories 104, 110 are kept secure, no attacker can decrypt. Upon proper access of the Pad and the data, the Pad and data may be left to retrieve again at a later date or removed and re-padded each time accessed.

Figure 2:
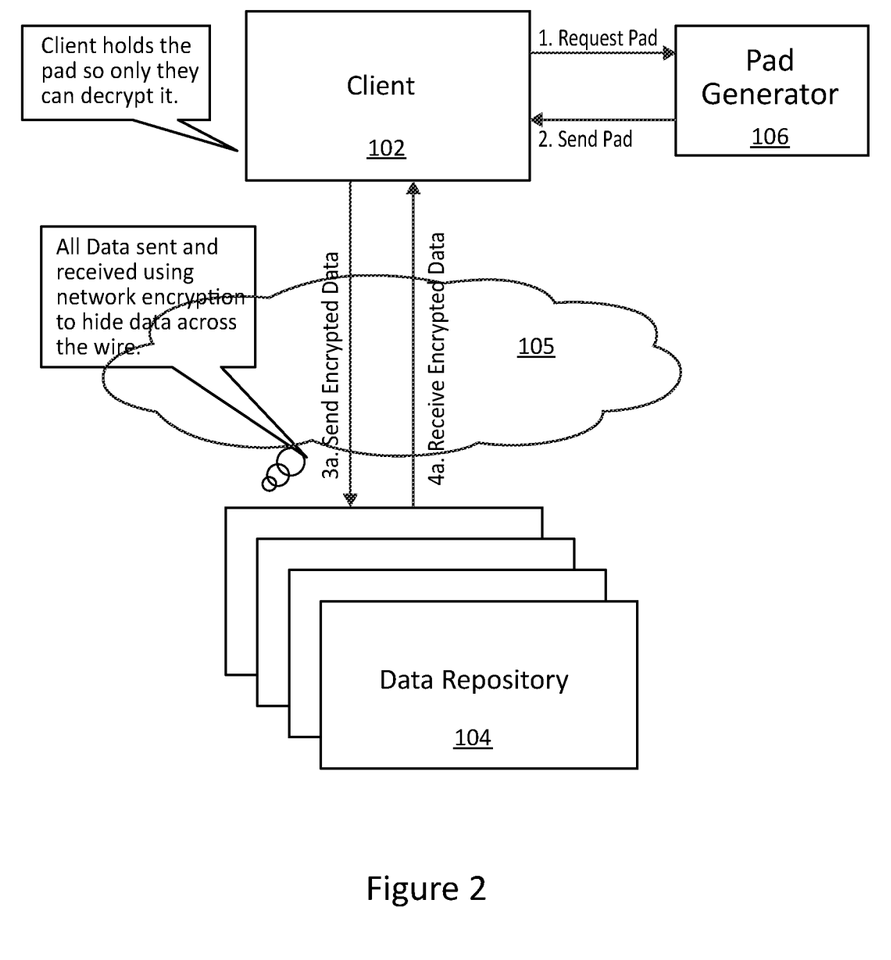
FIG. 2 is a block diagram showing an example non-limiting STOP storage with Pad generator where a client holds the Pad.

FIG. 2 shows a variation of FIG. 1 in which the client 102 requests a one time Pad from a Pad generator 106 and the one time Pad generator 106 sends the client a one time Pad in response to the client's request. The one time Pad generator 106 can be part of the client 102 or a separate entity from the client. The one time Pad generator 106 can be located together with or remotely from the client 102. The client 102 can communicate with the one time Pad generator 106 using a private line communication, a virtual private network, or any other secure way to avoid exposing the one time Pad to an attacker. The Pad generator 106 can be part of the client computing device 102, or it can be separate from the client computing device. The Pad generator 106 generates a random or pseudo-random OTP upon request and provides it via a secure communication channel to a computing device 102 that is generating a secure encrypted message. The Pad generator 106 may provide a streaming OTP, or it may provide an OTP that is sent in units or chunks.

In the FIG. 2 non-limiting embodiment, the onetime Pad is generated on one side with random data and sent to the other side. If the transmission is secure, there is no method in cryptography to attack this and it is proven impossible to crack. Through forward caching of OTP or other entropy data, latency increases are kept to an absolute minimum as the XOR or other algorithm for encryption and decryption can be a single CPU cycle instruction on most systems. As stated above, non-limiting embodiments provide mathematically provable secure methods for storing data electronically on a network 105 for later retrieval. A One Time Pad thus can be used to securely encrypt data for storage. The OTP used to encrypt the data is maintained and communicated separately from the ciphertext data.

Figure 3:
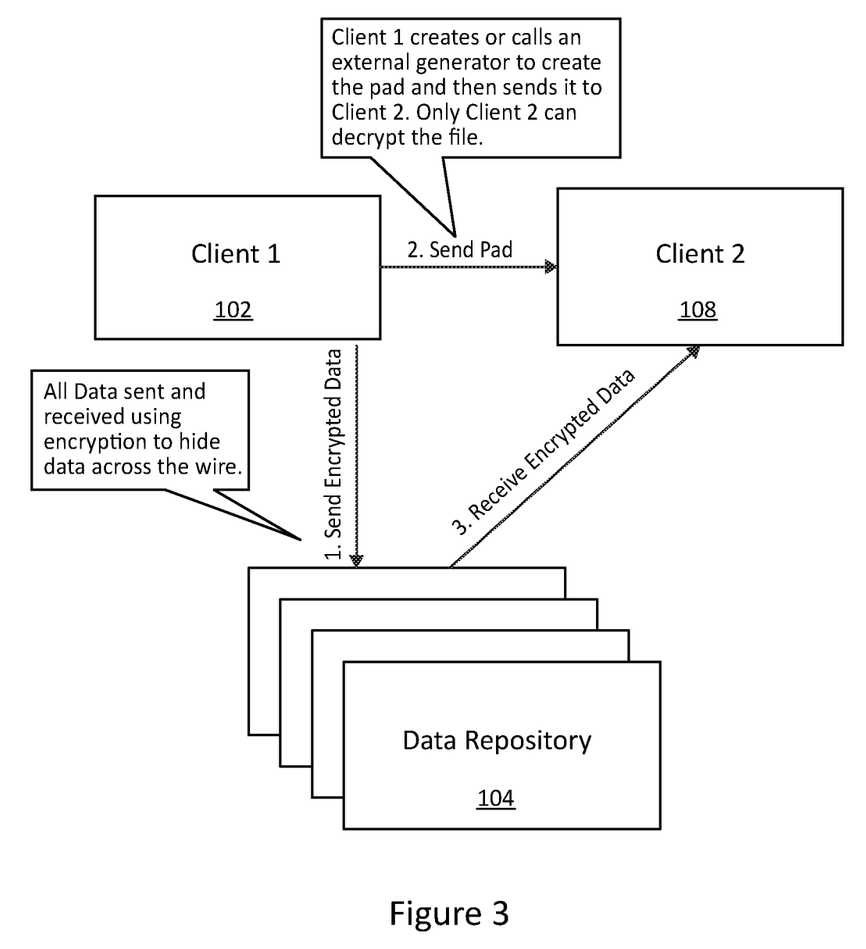
FIG. 3 is a block diagram showing an example non-limiting STOP storage where a second client receives a Pad directly.

FIG. 3 shows a further variation of FIG. 1 in which a second client 108 is able to retrieve the encrypted data from the repository 104. In this example, the client 102 encrypts the data using a one time Pad and sends the encrypted data to repository 104 for storage. Client 102 provides the one time Pad to client 108 or otherwise arranges for the client 108 to receive or obtain the one time Pad. For example, in one embodiment the client 102 can directly provide the one time Pad to the client 108 in some secure way such as using an out of band communicate (e.g., "sneakernet"), an encrypted communication, a private wire communication, or the like. In another example non-limiting arrangement, the client 102 can call an external generator 106 (see FIG. 2) to create the Pad and send it to the other client 108. In some examples, the generator 106 may require the second client 108 to provide multifactor authentication to authenticate itself to the generator 106 before the generator will provide the Pad to the second client.

Once the second client 108 has received the one time Pad from the generator 106, the second client can decrypt the message it has accessed directly from repository 104. The repository 104 need not necessarily be secure in some examples because the information it stores cannot be decrypted without an associated one time Pad. In other embodiments, repository 104 also requires the client 108 to authenticate itself e.g., using multifactor authentication before the repository will provide any data to the second client 108. Using these arrangements, the client 102 can securely share information with client 108 (and vice versa) without an attacker being able to access the information.

Figure 4:
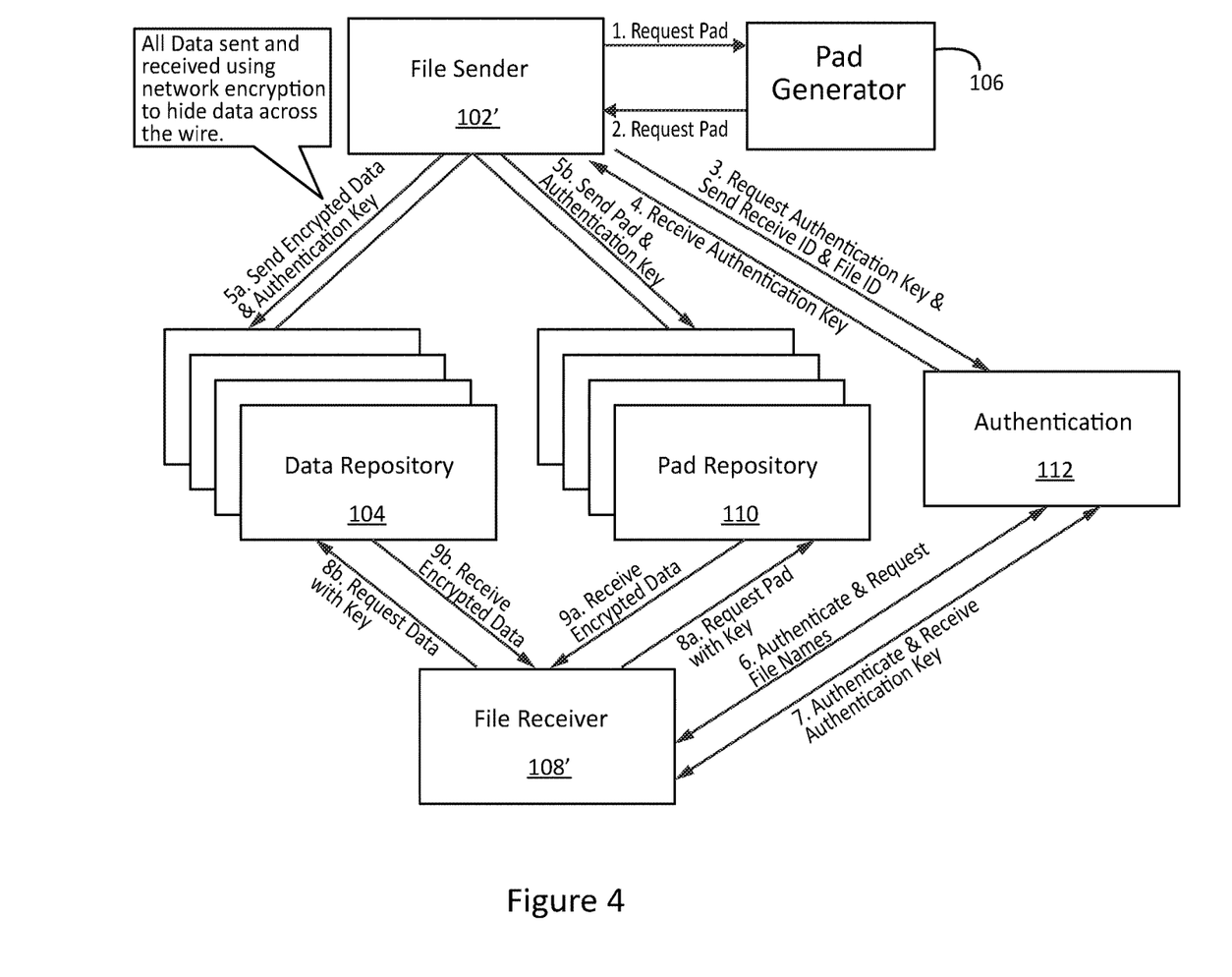
FIG. 4 is a block diagram showing an example non-limiting STOP storage with a Pad generator.

FIG. 4 shows an example non-limiting secure file sharing service implemented using the principles above. In this example, a file sender 102' wishes to send files to a file receiver 108'. The file sender 102' obtains one time Pads from a Pad generator 106, uses the one time Pads to encrypt files, and provides the encrypted files over a communications facility such as a network 105 to a data repository 104. The file sender 102' further provides the one time Pads to a Pad repository(ies) 110—which may be part of the Pad generator 106 or may reside on one or more remote servers. A file receiver 108' that wishes to receive and decrypt the shared files may first download the encrypted files from the data repository 104. It may then authenticate itself to the Pad repository 110 using an authentication facility 112 that may for example rely on multifactor authentication. Once the authentication facility 112 verifies that the file receiver 108' is who she says she is, the authentication facility 112 may send Pad repository 110 a signal (or send a ticket to file receiver 108') that will cause the Pad repository to send file receiver 108' the Pad(s) it needs to decrypt the files it has downloaded from data repository 104.

Figure 4A:
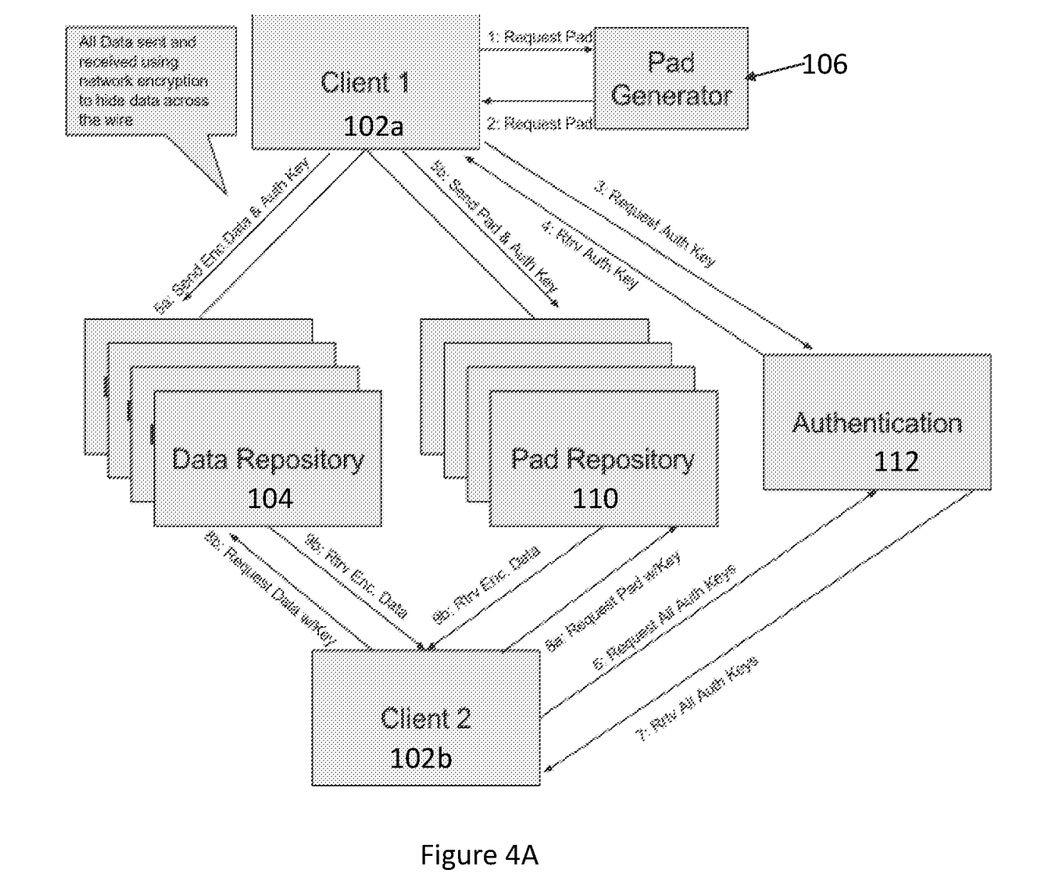
FIG. 4A shows a variation/application of the FIG. 4.

FIG. 4A shows the same architecture/service as FIG. 4 in the context of a client-server arrangement. In the example shown in FIG. 4A, data is persisted either on the end user's computer 102*q*, 102*b* or in the cloud. The OTP or streaming key is stored on one side ("Pad repository") and the encrypted data on the other ("data repository"). In some implementations, the Pad repository 110 and data repository 104 can be two different servers or other computing devices that have no physical or logical connections to or associations with one another. In other embodiments, they could be the same computing device that maintains a heap for example such that no traffic analysis or other technique could be used to determine which stored encrypted data goes with which stored OTP.

All data sent and received uses encryption to hide data across the transmission connection or path. Multi-factor authentication can be used as part of the data retrieval process to ensure that data is retrieved only by authorized computing devices and/or users.

The FIG. 4A architecture can be used to securely exchange information between computing devices 102*a*, 102*b*. In particular, client 1 computing device 102*a* stores information into the data and Pad repositories 104, 110 respectively, and client 2 computing device 102*b* retrieves the stored information. Similarly, client 2 computing device 102*b* stores information into the data and Pad repositories 104, 110 respectively, and client 1 computing device 102*a* retrieves the stored information. Thus, secure bidirectional communication between client 1 computing device 102*a* and client 2 computing device 102*b* is possible. In other embodiments, the communication could be one-way from client 1 computing device 102*a* to client 2 computing device 102*b*, or one-way from client 2 computing device 102*b* to client 1 computing device 102*a*. In some embodiments, there is no association or connection between the client 1 and client 2 computing devices 102*a*, 102*b*. Thus, only the authenticator has knowledge of both the client 1 and client 2 computing devices 102*a*, 102*b*. In still other embodiments, separate authenticators are used to authorize reading and writing from the repositories.

In the example shown, an authenticator 112 is used to authenticate the client 1 and/or client 2 computing devices 102*a*, 102*b* and/or their user(s). The authenticator 112 can ensure that only authorized computing devices and/or users can write and/or read information into/from the repositories 104, 110.

Figure 5:
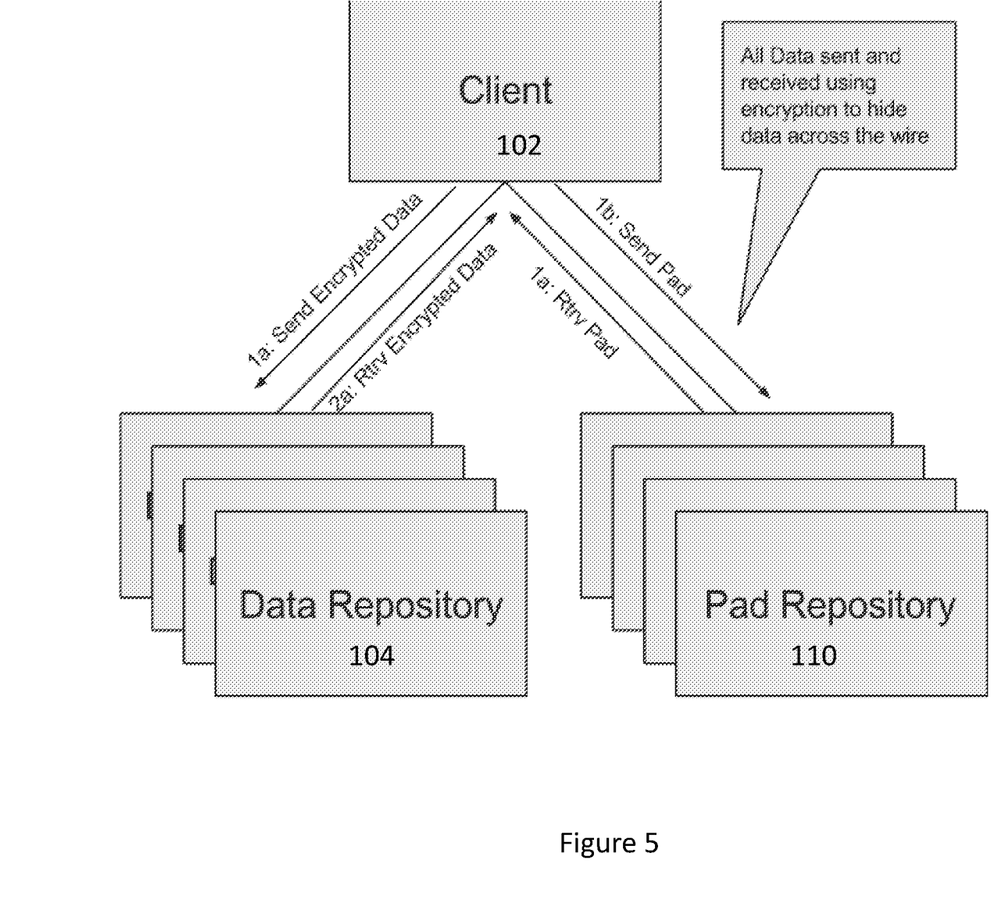
FIG. 5 is a block diagram showing an example non-limiting use of separate data repositories and Pad repositories.

FIG. 5 shows a further non-limiting example similar to FIG. 3 but with separate data and Pad repositories 104, 110 as in FIG. 4.

In still other embodiments, a third system resynchronization feature can be employed. In these embodiments, the clients 102*a*, 102*b* may have sufficient information to encrypt/decrypt but if two systems get out of synchronization for some reason, a third system such as a pad repository 110 as shown in the above drawings can be available to provide synchronization. This third system can be called "The Broker" or a system to broker the first and second systems back to a known, consistent state. In some such arrangements, Diffie-Hellman Resynchronization can be used to create a starting point to re-synchronize the first and second systems 102*a*, 102*b*. As long as this is not in the clear, this would allow to systems to re-synchronize on their own.

In still other non-limiting embodiments, an "Entropy Farm"—a process to "farm" a cache of entropy from the system—may be used to generate entropy in addition to or instead of entropy provided by a pad repository or pad generator.

While the technology herein has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. A secure communications method performed by a computing device comprising:
   encrypting a data exchange for communicating to another computing device and decrypting a data exchange provided by the another computing device;
   communicating with (a) a plurality of one time pad repositories providing a plurality of one time pads for use to encrypt and decrypt said data exchange, and (b) a plurality of data repositories disposed on a plurality of different respective networks, the plurality of data repositories being configured to store different portions of the encrypted data exchange for exchange between the computing device and the another computing device,
   wherein the plurality of one time pad repositories are not co-located with the plurality of data repositories and the plurality of data repositories are located on different networks, thereby disassociating the one time pads from the stored encrypted data exchange so an attacker cannot determine which one time pads can be used to encrypt or decrypt which portions of the stored encrypted data exchange on which data repository, and
   communicating via the network interface with at least one authenticator operatively coupled to the plurality of one time pad repositories and the plurality of data repositories, the at least one authenticator authenticating the computing device before permitting the computing device to access the plurality of one time pad repositories and the plurality of data repositories.

2. The method of claim 1 further including generating entropy and using the entropy, generating one time pads that are the same bit sizes as portions of the data exchange to be encrypted.

3. The method of claim 1 further including:
   decrypting the encrypted data exchange with the another computing device,
   using the at least one of the plurality of one time pad repositories and access control by the at least one authenticator to provide the another computing device with said one time pads.

4. The method of claim 1 further including associating each of the plurality of one time pad repositories with a one time pad generator that is separate from the computing device, and receiving streaming one time pads from a said one time pad generator after authorization by the at least one authenticator.

5. The method of claim 1 further including communicating said encrypted data exchange and receiving one time pads from the one time pad repositories over at least one network using network encryption thereby hiding data across the at least one network.

6. The method of claim 1 further including locating the computing device remotely from the one time pad repositories and the one time pad generator.

7. The method of claim 1 further including accessing the one time pad repositories and the at least one authenticator in the cloud without relying on any physical or logical connections to the one time pad repositories and the at least one authenticator or any associations therebetween.

8. The method of claim 1 further including supplying the computing device configured to comprise:
   at least one vector processor,
   at least one memory,
   at least one logic controller communicating with the at least one vector processor, the at least one logic controller providing further access to a network controller,
   an encryption controller, and
   an entropy source.

9. The method of claim 7 further including operating the computing device remotely from a computer arrangement, and accessing the computer arrangement via a network such as the Internet to store encrypted data for use by a user of the computing device.

10. The method of claim 1 further including operating the computing device as a client device.

11. The method of claim 1 further including:
    generating and maintaining an entropy cache separate and remote and otherwise isolated from a transmitter transmitting the encrypted data exchange,
    communicating using different channels of communication than channels used for transmitting encrypted portions of the data exchange, and
    securely protecting the transmitter.

12. The method of claim 1 further including:
    providing portions of the data exchange that are at least in part encrypted using a one time Pad to a data repository via a network/cloud, and
    receiving streamed contents of a one time Pad entropy cache for use in decrypting encrypted portions of a data exchange.

13. The method of claim 1 further including:
    forward caching one time pads or other entropy data to decrease latency, and
    streaming one time pads continually or discontinually on an on-demand basis for use in encrypting and decrypting.

14. The method of claim 1 further including authenticating to a second client different from a client that stores the encrypted data exchange.

15. The method of claim 1 further including preventing access by an attacker to a one time pad repository from giving the attacker access to or information about the location of the data repositories storing the encrypted data exchange.

16. The method of claim 1 further including scattering the plurality of data repositories across the Internet or other network and making the plurality of data repositories different from and in no way associated with the one time pad repositories used to store corresponding one time pads.

17. The method of claim 1 further including using a private line communication, a virtual private network, or other secure channel to communicate with the plurality of one time pad repositories, thereby avoiding exposing the one time pads to a network based attacker.

18. The method of claim 1 further including synchronizing at least one of the plurality of one time pad repositories back to a known, consistent state.

19. The method of claim 1 further including distributing the encrypted data exchange and/or the one time pads across different locations of at least one network.

* * * * *